(12) United States Patent
Andersen et al.

(10) Patent No.: US 8,745,155 B2
(45) Date of Patent: *Jun. 3, 2014

(54) NETWORK STORAGE DEVICE COLLECTOR

(75) Inventors: David M. Andersen, Charlotte, NC (US); Michael J. Mayer, Charlotte, NC (US); Eric B. Hobart, Charlotte, NC (US); Philip L. Richards, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 371 days.

This patent is subject to a terminal disclaimer.

(21) Appl. No.: 13/200,218

(22) Filed: Sep. 21, 2011

(65) Prior Publication Data

US 2012/0016954 A1    Jan. 19, 2012

Related U.S. Application Data

(63) Continuation of application No. 12/363,466, filed on Jan. 30, 2009, now Pat. No. 8,086,694.

(51) Int. Cl.
*G06F 15/16* (2006.01)

(52) U.S. Cl.
USPC .......................................................... 709/217

(58) Field of Classification Search
CPC .................... G06F 17/30861; G06F 17/30864; G06F 17/30876
USPC ................................................. 709/217–219
See application file for complete search history.

(56) References Cited

U.S. PATENT DOCUMENTS

| | | | |
|---|---|---|---|
| 7,472,182 B1 | 12/2008 | Young et al. | |
| 7,797,295 B2 * | 9/2010 | Bell et al. | 707/705 |
| 2002/0078035 A1 | 6/2002 | Frank et al. | |
| 2004/0199555 A1 | 10/2004 | Krachman | |
| 2005/0066190 A1 | 3/2005 | Martin | |
| 2005/0166082 A1 | 7/2005 | Williams et al. | |
| 2006/0230044 A1 | 10/2006 | Utiger | |
| 2007/0005637 A1 | 1/2007 | Juliano et al. | |
| 2007/0073894 A1 * | 3/2007 | Erickson et al. | 709/230 |
| 2007/0112783 A1 | 5/2007 | McCreight et al. | |
| 2007/0168455 A1 | 7/2007 | Sun | |
| 2007/0283158 A1 | 12/2007 | Danseglio | |
| 2008/0140348 A1 | 6/2008 | Frank | |
| 2008/0154987 A1 | 6/2008 | Kottomtharayil et al. | |
| 2009/0205026 A1 * | 8/2009 | Haff et al. | 726/5 |
| 2010/0107104 A1 * | 4/2010 | Bruce et al. | 715/772 |

OTHER PUBLICATIONS

Storage Optimization Less is More-Part 2, Apr. 2008, http://storageoptimization.wordpress.com/2008/04/, pp. 1-6.*

(Continued)

*Primary Examiner* — Chirag R Patel
(74) *Attorney, Agent, or Firm* — Michael A Springs; Moore & Van Allen PLLC; James C. Edwards

(57) ABSTRACT

Embodiments of the invention relate to systems, methods, and computer program products for remotely collecting data stored by a user in one or more network storage areas residing on a network. For example, embodiments of the method involve utilizing a mapping tool to identify at least one network storage area associated with the user, utilizing a collection tool to access at least one network storage area via a network, copying the data stored on the at least one network storage area, and transmitting the data from the at least one network storage area to a collection server.

17 Claims, 3 Drawing Sheets

(56) References Cited

OTHER PUBLICATIONS

Extended European Search Report mailed May 18, 2010 for European Application No. EP 10 25 0144

European Patent Office. European Office Action dated Jul. 19, 2012. European Application No. 10 250 144.2 Name of Applicant: Bank of America Corporation. English Language. 5 pages.

* cited by examiner

NETWORK STORAGE DEVICE COLLECTOR

CROSS-REFERENCE TO RELATED APPLICATION

This application is a continuation of and claims priority from allowed, co-pending U.S. patent application Ser. No. 12/363,466, filed on Jan. 30, 2009 and entitled "Network Storage Device Collector".

FIELD

In general, embodiments of the invention relate to methods, systems and computer program products for electronic discovery and, more particularly, remotely collecting data from network storage devices residing on a network.

BACKGROUND

Companies conducting litigation face exhaustive legal discovery requests that require the collection of substantial amounts of electronic data, including user-created and/or user-modified files stored on network storage devices residing on the companies' networks. Collecting this data is a labor intensive process that requires active participation from the employees of the company and substantial work by those managing the discovery process. Current methods require that the employee herself be responsible for identifying the particular network storage devices where she has stored and/or accessed and modified files. Because the employee may forget where she has stored certain files and/or may not be able to communicate where files are stored because she does not fully understand the architecture of the network, the possibility exists that the employee could inadvertently fail to disclose certain network storage devices that she uses, leading the discovery managers to unintentionally fail to collect potentially relevant data. Furthermore, it is possible that an employee wishing to circumvent the collection process could intentionally omit certain storage devices when making her mandatory disclosure to discovery managers.

In terms of the actual collection process, current methods require manually accessing the identified network storage areas and manually copying of the files located therein. This time-consuming process does not ensure that all files belonging to the targeted employee are obtained. In addition, in networks where aliases may be used, it is possible that the discovery manager attempting to identify files for collection may overlook files that actually belong to the targeted employee. In conclusion, it is apparent that current electronic discovery solutions rely too much on the information communicated by the particular individual whose data is being collected and cause tedious amounts of work for discovery managers. Therefore, there is a need for an automated electronic discovery system and method that easily identifies files stored in network storage areas that belong to an individual and automatically collects those identified files, with little to no input from the discovery process managers or the individual whose files are being collected.

SUMMARY

Embodiments of the invention relate to systems, methods, and computer program products for remotely collecting data stored by a user in one or more network storage areas residing on a network. For example, embodiments of the method involve utilizing a mapping tool to identify a path of a network storage area, utilizing a collection tool to access the network storage area via the network, copying the data stored on the network storage area, and transmitting the data from the network storage area to a collection server.

In some embodiments, wherein the network storage area is a personal network storage area belonging to the user. According to some embodiments, the mapping tool is configured to crawl the network, scan at least one server residing on the network, and transmit to a database server the path of the network storage area. In some embodiments, the collection tool accesses the network storage area by utilizing the path transmitted by the mapping tool. The mapping tool may also be configured to crawl the network, scan a plurality of servers residing on the network, and transmit to a database server a plurality of paths, wherein each path in the plurality of paths identifies a personal network storage area, and wherein at least two of the personal network storage areas identified by the plurality of paths belong to different users.

In some embodiments of the present invention, the database server is configured to house a directory of the plurality of paths, wherein each path in the plurality of paths is related within the database server to an identifier associated with the user to whom the personal network storage area identified by the path belongs. In such embodiments, the collection tool may access the network storage area by utilizing the directory. In other embodiments, the mapping tool identifies the path of the network storage area by confirming that the path contains an identifier associated with the user.

According to embodiments of the invention, the collected data may be stored temporarily in a landing zone as the data is transmitted to the collection server and then transmitted to a long-term network storage device after a determination is made that the collection is complete. The collection server may be configured to temporarily store the data in a landing zone as the data is transmitted to the collection server, and transmit the data to a network storage device after a determination is made that the collection is complete. The methods of the present invention may also include housing in a database server a catalog of the data stored in the network storage area, and updating the catalog as the data is transmitted to the utilizing the catalog to make a determination that the collection is complete.

In some embodiments, a method is provided for collecting data stored by a user in a network storage area residing on a network, where the method involves identifying a path of network storage area, accessing the network storage area, determining whether the data stored in the network storage area meets predefined criteria, copying the data that meets the predefined criteria, and transmitting the data that meets the predefined criteria to a collection server. In embodiments where the network storage area is a personal network storage area, identifying the path of the network storage area may be accomplished by utilizing a mapping tool configured to crawl the network, scan at least one server residing on the network, and transmit to a database server the path of the network storage area, and accessing the database server to obtain the path of the network storage area. In embodiments where the network storage area is a shared network storage area, identifying the path of the network storage area may be accomplished by obtaining a description of the location of the network storage area, utilizing a file browsing tool to browse a plurality of network storage areas, and confirming that a network storage area located with the file browsing tool matches the obtained description. In some embodiments, the accessing, determining, copying, and transmitting steps described above are all undertaken by a collection tool that accesses the network storage area via the network. With regard to the predetermined criteria, in some embodiments, the predetermined criteria comprise a restriction on nearline files. In other embodiments, the predetermined criteria comprise a restriction on files having certain file extensions. In still other embodiments, the predetermined criteria comprise a restriction on files exceeding a certain size.

According to embodiments of the present invention, a system for collecting data stored by a user in a network storage area residing on a network is provided, where the system includes a mapping tool configured to crawl the network and determine a path of the network storage area and a collection tool configured to access the network storage area via the network using the path, copy data stored in the network storage area, and transmit the copied data to a collection server. The system may also include a case management server providing a user interface through which identifying information about the user may be entered and the collection process may be observed and managed. In some embodiments, the database server has at least two distinct areas, including an area designated for housing a directory generated with data transmitted by the mapping tool and an area designated for housing data relating to ongoing collections. The system of the present invention may also include, in certain embodiments, a second database server, wherein the first database server houses a directory generated with data transmitted by the mapping tool and the second database server houses data relating to ongoing collections.

In some embodiments, the mapping tool is configured to be run on the collection server. In some embodiments, the collection tool is configured to recognize nearline files that appear to be stored in the network storage area. The collection tool may also be configured to generate a size estimate of the data stored in the network storage area. The collection tool may be further configured to transmit to the database server a catalog of the data contained in the network storage area. In some embodiments, the collection server is configured to transmit to the database server updated status information regarding the transmission of the copied data. The system may further include a landing zone configured to store temporarily and/or stage the copied data as the copied data is received by the collection server and a long-term network storage device configured to permanently store the copied data. In some embodiments, the collection server is configured to temporarily store the copied data in a landing zone as the data is transmitted to the collection server, and transmit the data to a long-term network storage device after a determination is made that the collection is complete.

Embodiments of the present invention also provide a computer program product for identifying the path of a personal network storage area residing on a network and belonging to a user, the computer program product comprising a computer readable medium having computer readable program instructions stored therein, wherein said computer readable program instructions include first instructions configured for crawling the network, second instructions configured for evaluating paths of network storage areas residing on the network to determine if a path contains an identifier associated with a particular user, and third instructions configured for transmitting to a database each path containing an identifier associated with a particular user and the identifier contained therein such that the identifier and the path may be related in the database.

BRIEF DESCRIPTION OF THE DRAWINGS

Figure 1:
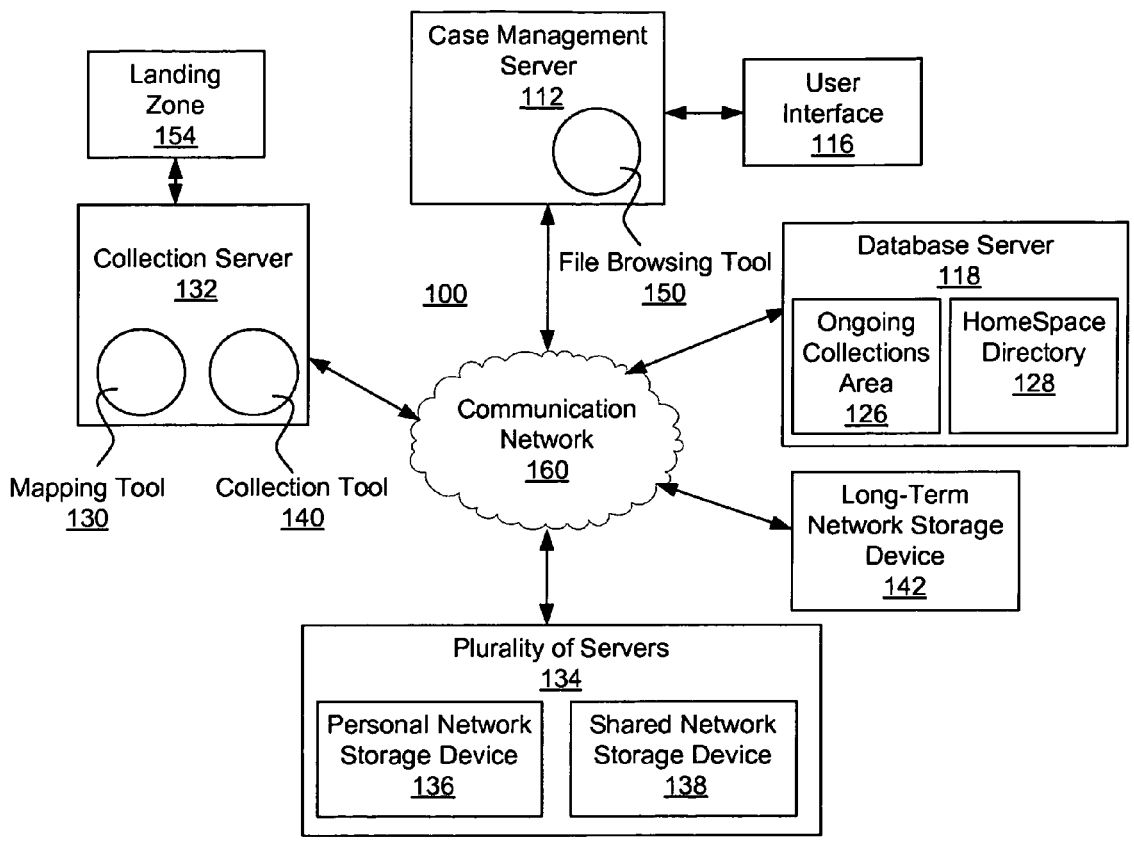
Figure 2:
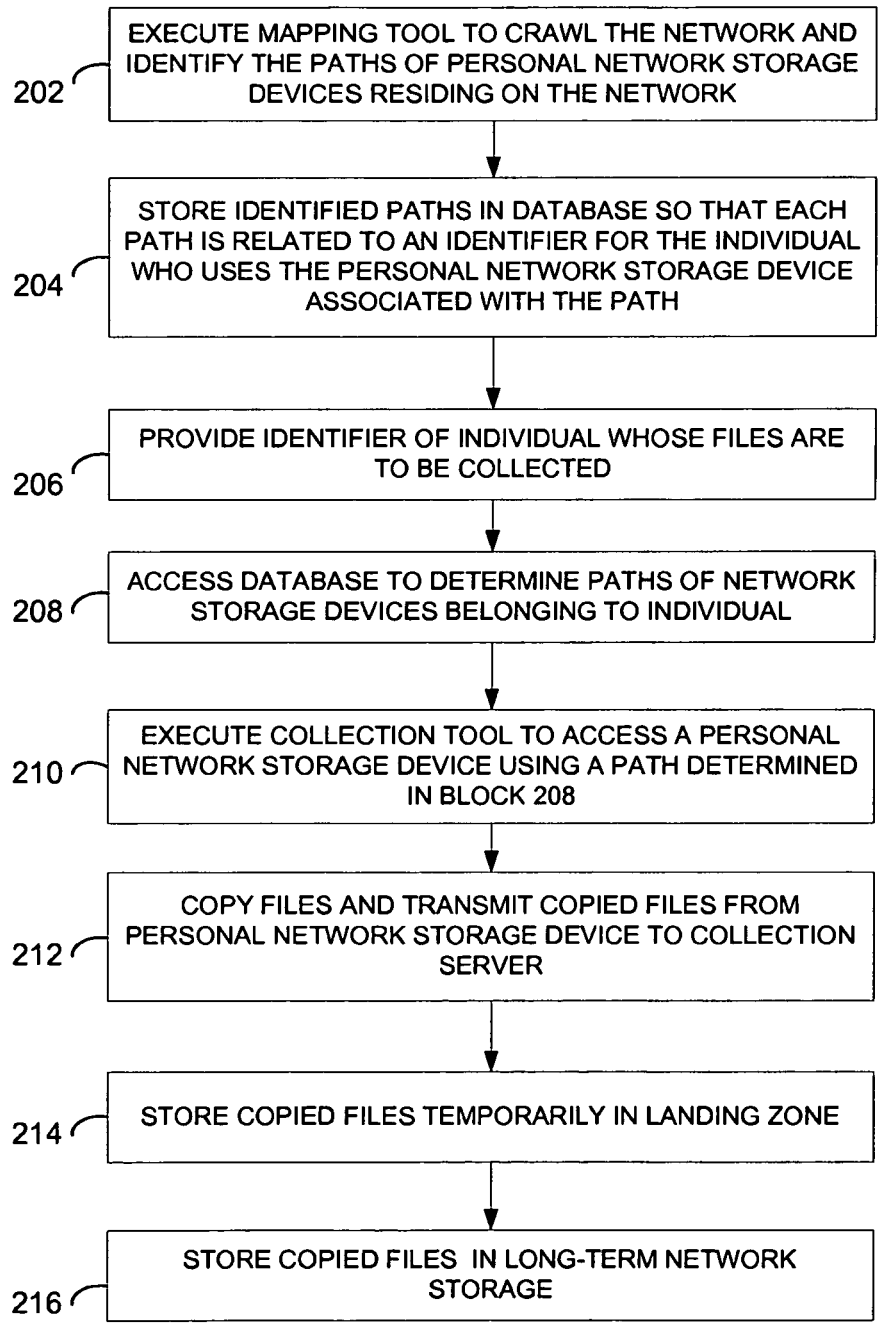
Figure 3:
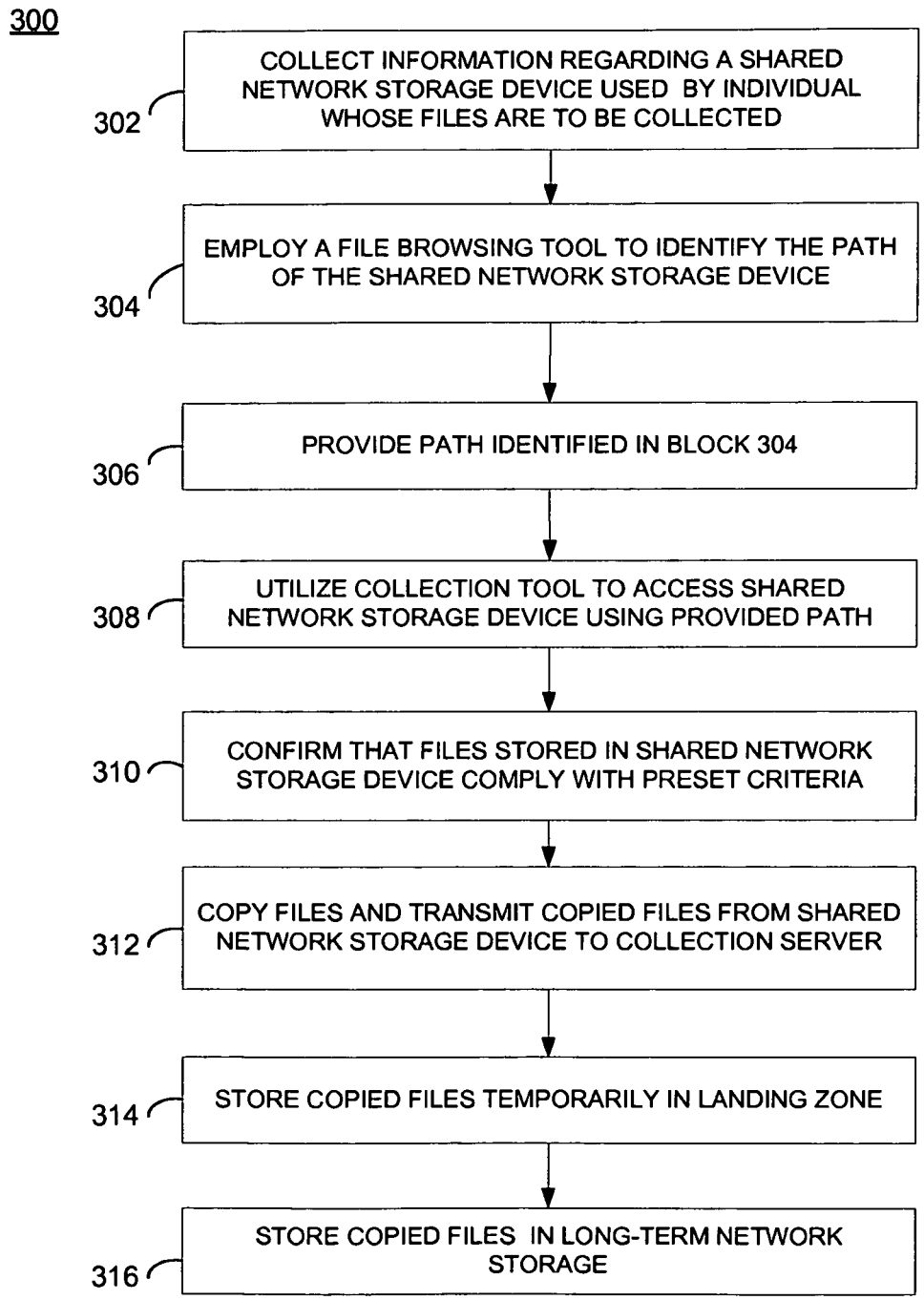

Having thus described embodiments of the invention in general terms, reference will now be made to the accompanying drawings:

FIG. 1 illustrates an environment in which the processes described herein are implemented according to one embodiment of the invention;

FIG. 2 is a flow chart illustrating an exemplary process of remotely collecting data from a personal network storage area, in accordance with an embodiment of the invention; and FIG. 3 is a flow chart illustrating an exemplary process of remotely collecting data from a shared network storage area, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 illustrates an exemplary network storage collection system 100 in accordance with an embodiment of the invention. The collection environment includes a plurality of servers, machines, and network storage devices in communication with one another over a communication network, as would exist, for example, in a company's information technology operating environment. In particular, a case management server 112, at least one database server 118, a collection server 132, a long-term network storage device 142, and a plurality of servers 134, including at least one personal network storage area 136 and at least one shared network storage area 138, are all in communication over a communication network 160. The communication network 160 could be a wide area network, including the Internet, a local area network or intranet, a wireless network, etc.

As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." In addition, network storage areas, including both Home-Spaces and Shared Drives, may also be referred to herein as "file servers." Such references should not be construed to limit the type of network storage area or device that may be employed in the system and method of the current invention.

The network storage collection system 100 also includes a mapping tool 130 configured to crawl the communication network 160 and identify those file servers that contain HomeSpaces assigned to individual users and a collection tool 140 configured to access one or more identified file server(s) and copy and transmit the data stored in the file server. The mapping tool 130 and the collection tool 140 are each described in more detail below.

The case management server 112 provides user interface management for a user interface 116. In one particular embodiment, the case management server 112 is a web server that can be accessed via web browser. Through the case management server 112, the user interface 116 may be presented to a user for the purposes of initializing and managing both the mapping process and the network storage device collection process. For illustrative purposes, it will be assumed herein that the user interacting with the user interface 116 is an employee or contractor of the company who serves a case management and electronic discovery management role, and hereafter is referred to as the "eDiscovery Manager." As discussed in greater detail below, the eDiscovery Manager can utilize the user interface 116 to identify the user whose files stored in network storage areas should be collected and review the progress of those selected collections. Furthermore, the eDiscovery Manager may utilize the user interface 116 to direct the mapping tool 130 to be run or to review the HomeSpace directory 128 generated by the findings of the mapping tool 130. It should be appreciated, however, that any individual could use the user interface 116 to perform the manual functions herein attributed to the eDiscovery Manager, and, indeed, that an automated process could perform those functions as well.

The case management server 112 is in communication with the database server 118 and the collection server 132. The database server 118 is configured to provide database services for the system, including housing the HomeSpace directory 128, which is generated by the mapping tool 130, as well as ongoing collections data 126, which may include a listing of HomeSpaces and/or Shared Drives selected for collection and metadata concerning the status and/or progress of selected collections. It should be understood that multiple database servers could be employed instead of a single database server, and reference to a single database server is for illustrative and convenience purposes only. For example, the HomeSpace directory 128 could be stored in one database server and the ongoing collections data 126, including the queue of paths for the targeted network storage areas and the progress data, could be stored in another database server.

In accordance with some embodiments of the invention, the mapping tool 130 is configured to crawl the communication network 160 and examine a plurality of servers 134 residing on the communication network 160 to locate and identify the path of any personal network storage area on each server (HomeSpaces) 136. According to different embodiments, the mapping tool 130 may be run on the collection server 132, the case management server 112, or another server in the communication network 160. The eDiscovery manager may run the mapping tool 130 on demand via the user interface 116 and/or the mapping tool 130 may be scheduled to run at a predetermined time or at predetermined intervals. In some embodiments, the mapping tool 130 is a Windows service that is scheduled to execute through use of Windows Scheduled Task. With regard to the scope of the reach of the mapping tool 130, according to one embodiment, the communication network 160 is the private network of a company or organization and the plurality of servers 132 comprises all the servers residing on the company's private network. According to other embodiments, the plurality of servers 134 is a designated subset of all servers residing on the communication network 160. The rules determining which servers are included in the subset may be defined by the eDiscovery Manager through the user interface 116 and communicated to the mapping tool 130 so that it will only examine servers that meet the input rule requirements. For example, the eDiscovery Manager may determine that only certain servers associated with a particular division within an organization or only a particular type of server, such as file servers, should be targeted by the mapping tool 130. In one embodiment, the eDiscovery Manager may utilize Microsoft's Active Directory to determine the plurality of servers 134 that should be targeted by the mapping tool 130. Alternatively, in some embodiments, the mapping tool 130 may be configured to identify the servers that should be examined after it has begun crawling the communication network 160.

As the mapping tool 130 crawls the communication network 160, it is configured to examine each server in the plurality of servers 134 and transmit to the database server 118 the path of any network storage area within the plurality of servers 134 that it positively identifies as a HomeSpace. In some embodiments, the mapping tool 130 is configured to explore the plurality of servers 134 by obtaining and reviewing the directories on each server and evaluating the paths of each network storage area therein, including folders and other storage devices and resources. With regard to identifying a particular network storage area as a HomeSpace, according to some embodiments, the mapping tool 130 is configured to utilize conventional naming techniques for paths in the communication network 160 to identify those paths of network storage areas within the plurality of servers 134 that contain an indicator, based on the conventional naming techniques, that the particular storage areas associated with those paths are accessed and used by only one user, and are therefore HomeSpaces. In accordance with some embodiments of the invention, each user of the communication network 160 is assigned at least one user identification and those user identifications are the indicators that the mapping tool 130 attempts to locate within paths when identifying HomeSpaces. In such embodiments, it is the convention that the paths of personal storage areas (i.e. HomeSpaces) on the communication network 160 contain the user's user identification. On the other hand, paths of shared network storage areas do not contain user identifications. Therefore, the mapping tool 130 may explore the directories of each server within the plurality of servers, evaluate each path in turn, and make a determination as to whether or not the path contains a user identification.

If it is determined that the path contains the designated indicator, for example, a user identification, the mapping tool 130 is configured to positively identify the particular network storage area identified by that path as a HomeSpace and transmit to the database server 118 the particular user identification and the path of the HomeSpace. The database server 118 compiles this information into the HomeSpace directory 128. As each user identification may have more than one HomeSpace associated with it (meaning that a user may store data and files on multiple HomeSpaces), the mapping tool 130 may transmit the same user identification multiple times in connection with different paths. This enables the HomeSpace directory 128 to compensate for network changes, including server replacements, without user intervention. In some embodiments, the database server 118 is configured to store multiple entries for a single user identification and organize the user identifications and paths within the HomeSpace directory 128. The relational database structure enables multiple records to be stored for each user identification. Once the mapping tool 130 has finished crawling the communication network 160 and examining the plurality of servers 134, the HomeSpace directory 128 should be a complete listing of paths for all HomeSpaces residing on the communication network 160 (as identified by the mapping tool 130), identified by the particular user identification of the user to which each HomeSpace belongs.

In addition to the user identifications and HomeSpace paths, the database server 118 may also store in the HomeSpace directory 128 the time at which the path and user identification was recorded or another time that can be used for reference by the eDiscovery Manager to determine when the HomeSpace directory 128 or a particular entry within the HomeSpace directory 128 was generated. Also, according to some embodiments, the mapping tool 130 is configured to recognize and transmit, and the database server 118 is configured to house, an indication of the last time the HomeSpace was accessed by the particular user, for example, the last time any data was read from and/or written to the HomeSpace. Additionally, in some embodiments, the mapping tool 130 is configured to recognize when multiple paths map to the same network storage area. The collection server 132 compares paths for the same user to determine if duplicative entries exist. This advantageously enables avoidance of multiple collections of the same data.

Where the mapping tool 130 is run on a periodic basis, according to some embodiments, the database server 118 may store the data collected by the mapping tool 130 on a predetermined number of completed executions or over a predetermined time period. Therefore, there may be multiple HomeSpace directories stored in the database server 118 at a single time, including the current HomeSpace directory 128, generated from the data transmitted by the mapping tool 130 during its most recent execution, and older, perhaps outdated HomeSpace directories, generated from data gathered during prior executions. Periodically executing the mapping tool 130 (at relatively short intervals, for example, once a day or once a week) advantageously allows the eDiscovery Manager to have an up-to-date directory of the current state of the network, at least with regard to HomeSpaces. Therefore, the eDiscovery Manager does not have to rely on managers of the communication network 160 to provide notification when changing server names, migrating a HomeSpace location from one server to another because the first is being retired, taking servers offline, etc. The current state of the system (meaning the network location of HomeSpaces) will be captured by the mapping tool 130 and represented by the current HomeSpace directory 128. Furthermore, by maintaining old HomeSpace directories generated by previous executions of the mapping tool 130, at least for a certain time period, the eDiscovery Manager has the ability to view the state of the system at a certain point in history. This could be useful in attempting to locate files that were stored on a server that no longer appears to be in use, or in identifying file servers where a particular individual may have stored files on a particular date. This can also aid in discovery of offline files that have been stored to tape or other long term storage media, but may need to be produced for litigation purposes.

As discussed more generally below, the eDiscovery Manager can utilize the user interface 116 to identify a certain user whose files should be collected. In some embodiments of the present invention, the information input by the eDiscovery Manager includes a user identification. Upon input of the user identification, the case management server 112 is configured to utilize the HomeSpace directory 128 in the database server 118 to identify the particular paths of HomeSpaces associated with the input user identification. According to other embodiments, the eDiscovery Manager may input the name of an individual, a human resources identifier, or another input that identifies a particular individual. This is particularly advantageous in networks where one individual has multiple user identifications. In these embodiments, the case management server 112 is configured to reach out to a pre-existing datastore, perhaps in the database server 118, that houses user identifications correlated to the particular identifier input. In this manner, the case management server 112 may obtain all user identifications associated with the selected individual. Therefore, rather than requiring the eDiscovery Manager to enter each user identification of a particular individual, the system allows the eDiscovery Manager to enter just one identifier for the individual, and automatically locates all HomeSpace paths stored in the database server belonging to any of the individual's user identifications. In some embodiments, the case management server 112 is configured to copy and store the identified paths in a distinct area in the database server 118 that houses data relating to ongoing collections, the ongoing collections data area 126. Alternatively, as discussed above, the listing of targeted paths of HomeSpaces may be stored by the case management server 112 in an entirely separate database server.

On the other hand, with regard to identifying Shared Drives (as opposed to HomeSpaces) for collection, in accordance with some embodiments of the present invention, the user interface 116 is configured to receive a path of a Shared Drive input by the eDiscovery Manager and store the path in the database server 118 in the area designated for ongoing collections. According to different embodiments, the Shared Drive paths may be kept separate from the HomeSpace paths within the database server 118 or may be added to the HomeSpace paths to form one queue. Once a particular user of the communication network 160 is chosen for the collection process, the eDiscovery Manager will undertake to identify the particular shared network resources that that individual is using, and eventually, the paths associated with those shared network resources. This may be accomplished through conversations with the particular individual, by utilizing data returned from a local collection tool deployed to the particular user's machine, and/or by utilizing a file browsing tool 150.

According to some embodiments of the present invention, the file browsing tool 150 is configured to be utilized by the eDiscovery Manager through the user interface 116. The file browsing tool 150 gives the eDiscovery Manager elevated authority within the communication network 160 to access, in a limited manner, all or certain file servers within the communication network 160 that are used by the user being collected. While the file browsing tool may not allow access to the actual files stored on certain file servers, it allows the eDiscovery Manager to browse through the directories of the file servers, locate files that have been accessed by the user, and determine the size of the files. In accordance with some embodiments, the eDiscovery Manager will initially have a general idea of a particular file server that the user has used in the past. For example, the user may communicate to the eDiscovery Manager a particular folder name and/or drive name on which she has stored files. Additionally, in some embodiments, the eDiscovery Manager may have already undertaken a local collection process on the user's machine wherein the collection tool employed in that process returned a list of the network resources that the user of that machine has used. In that event, the eDiscovery Manager may be aware of the particular drive referenced by the user. The eDiscovery Manager may then employ the file browsing tool to browse out to the particular drive mentioned, scan the folders for any folder having a name resembling that name given by the user, identify any particular files created by and/or accessed by the user, determine the size of such files, and retrieve the path of any folder (or Shared Drive) containing data belonging to the user. The eDiscovery Manager may then decide whether or not to add the retrieved paths of the Shared Drives to the collection queue for the collection tool 140 in the database server 118 through the user interface 116.

According to some embodiments of the invention, if a path of a HomeSpace or Shared Drive is listed in the collections queue of the ongoing collections area 126 of the database server 118, the database server 118 or the case management server 112 may be configured to affirmatively request that the collection tool 140 be executed to collect the data stored in the listed HomeSpace or Shared Drive. In some embodiments, the collection tool 140 is run on the collection server 132, and the collection server 132 monitors the queue in the database server 118 to determine if the collection tool 140 should be executed. It should be appreciated, however, that the collection tool 140 may be located on another server in the communication network 160. In some embodiments, the collection tool 140 is configured to use elevated network credentials to be able to access any of a certain number of file servers belonging to a particular known domain or domains, for example, domains relating to a single company or entity. Therefore, upon execution of the collection tool 140, the collection tool 140 locates the file server identified by the path given in the collections queue and accesses that particular file server for the purposes of copying the data contained therein. In the event the collection tool 140 is unable to locate the file server based on the given path, the collection tool 140 relates to the database server 118 and/or the case management server 112 that the collection failed due to inability to locate the identified file server. According to different embodiments, the database server 118 may keep the path in its queue for another collection attempt or make an indication in its record that the collection of that file server failed, removing that path from its active queue. The eDiscovery Manager may also be prompted via the user interface 116 to provide additional information or investigate the failed collection. At this point, the eDiscovery Manager may decide to use the file browsing tool 150 to determine the accuracy of the given path.

With regard to the collection tool 140, according to some embodiments, the collection tool 140 is configured to access the file server located at the given path, whether the file server is a HomeSpace or a Shared Drive, copy the data residing on the file server, and transmit the copied data to the collection server 132. The collection tool 140 may be programmed with preset instructions that allow it to only copy files meeting certain criteria, for example, files that have certain file extensions. Alternatively, the programmed instructions may prevent the collection tool 140 from copying files having certain file extensions or other attributes. Either of the foregoing is advantageous if the eDiscovery Manager is not interested in copying executable files or source code, for example. In some embodiments, the collection tool 140 is also configured to generate a size estimate of the files that are to be copied and transmitted by the collection tool 140. In one embodiment, the collection tool 140 will automatically begin the collection process (copying and transmitting data) if the size estimate falls below a predetermined threshold. On the other hand, if the size estimate exceeds the threshold, the collection tool 140 is configured to return the size estimate to the case management server 112 to be displayed to the eDiscovery Manager through the user interface 116. The eDiscovery Manager may then be cancel the pending collection or authorize the collection tool 140 to collect despite the quantity of data. While this size estimate feature may be employed in collecting from HomeSpaces, it is most advantageous when collecting from Shared Drives, as Shared Drives are utilized by multiple people and, as such, may house significantly more data.

In addition, and in accordance with certain embodiments of the present invention, prior to copying and transmitting the files located at a targeted file server, the collection tool 140 is configured to recognize if certain files appearing in the directory of a file server are in fact stored in nearline storage, rather than in the network storage of the file server itself. In nearline storage, the files are stored on hard storage devices, such as DVDs, disks, or cartridges, and must be retrieved and loaded by a robot before a user (or the collection tool 140) can access the data from the files. Such files may be referred to herein as "nearline files." Because of the nature of nearline files, the collection process may be compromised when the collection tool 140 attempts to collect nearline files. Compromise occurs when the server is tasked with too many simultaneous retrieval jobs, thus causing excessive strain on the file server. This will prevent comprehensive collection, since each file must be manually retrieved and loaded before the collection tool 140 may commence copying. Therefore, it is an advantageous feature of certain embodiments of the present invention that the collection tool 140 is configured to determine whether a particular folder that it is collecting from a file server contains more than a token amount of nearline files. The threshold amount may be predetermined by the eDiscovery Manager and programmed into the collection tool 140. If the threshold amount is exceeded, the collection tool 140 may transmit a message through various servers to be displayed to the eDiscovery Manager through the user interface 116 that the file server contains nearline files in excess of the authorized amount. According to different embodiments, the case management server 112 may allow the eDiscovery Manager to instruct the collection tool 140 to collect anyway, by entering that instruction through the user interface 116, or the case management server 112 may prevent any collection of the nearline files, instead storing a listing of the nearline files, as transmitted by the collection tool 140, in the database server 118 so that a determination may be made in the future as to whether or not to collect those nearline files.

After accessing the targeted network storage area, whether a HomeSpace or Shared Drive, the collection tool 140 is configured to copy the files from the particular file server, in accordance with any rules governing file types and sizes as programmed into the collection tool 140. In addition to copying the files, the collection tool 140 is also configured to transmit to the database server 118 a catalog of the files that it is collecting, to be housed in the ongoing collections area 126 and related to other data pertaining to the particular collection that is already housed there. As described in greater detail below, this catalog may be referenced by the collection server 132 in order to determine whether collection is complete.

With regard to transmission of the files themselves, according to one embodiment of the invention, the collection tool 140 is configured to compress and hash the files prior to transmitting them from the file server to the collection server 132. Compressing the files prior to transmission thereof increases the rate of transmission and therefore advantageously decreases total collection time. In addition, the bandwidth required for transmission decreases when the files being transmitted are compressed, so compressing the files also advantageously avoids degradation of network performance. Hashing the files prior to transmission thereof allows a determination to be made following transmission that the data arriving at the collection server 132 is the same data that was collected from the target file server. It should be appreciated that one, both, or neither of the foregoing techniques may be employed by the collection tool 140 prior to transmitting the copied data to the collection server. In addition to compressing and hashing the files prior to transmission, in accordance with some embodiments of the invention, the collection tool 140 may create and assign an evidence object, or a unique identifier acting as metadata, to all data collected from a certain HomeSpace or Shared Drive. This evidence object adheres to the collected files as they are transmitted throughout the communication network 160 (eventually ending in storage of the long-term network storage device 142), so that it may always be determined where certain data and/or files originated.

The collection server 132 is configured to receive the files transmitted by the collection tool 140 from the network storage area. In one embodiment, the collection server 132 deposits the files as they are received from the network storage area, into a landing zone 154 that serves as both a temporary network storage area and a staging area for the incoming data, where various functions could be performed on the data. The landing zone 154 could be a network storage device, such as a file server. According to another embodiment of the invention, the collection server 132 also communicates with the database server 118 in order to update the catalog stored in the ongoing collections area 126 of the database server 118. As each file from the targeted file server is uploaded to the collection server 132 and stored temporarily in the landing zone 154, the collection server 132 communicates to the database server 118 that the file has been collected, and that item in the catalog is marked accordingly. On the other hand, in the event a file is not successfully transmitted to the collection server 132, the collection server 132 will communicate an error message to the database server 118 and that item in the catalog will not be marked as collected. It should be appreciated that the status of the collection of each file could be communicated to the database server 118 by alternative mechanisms, including by the collection tool 140. The queue for not-collected files is examined by the collection tool 140 when determining which file to retrieve next.

Through utilizing this cataloging method, the system operates to resume interrupted collections at the point of interruption. For example, if a particular collection is interrupted due to a loss of network connectivity between the targeted file server and the collection server 136, either the collection tool 140 or the collection server 132, according to different embodiments of the invention, is configured to reach out to the database server 118 upon reestablishment of the connection. The catalog housed in the ongoing collections area 126 of the database server 118 can then be accessed to determine which files from the file server were successfully uploaded to the collection server 132 and which remain to be uploaded. At that point, the collection tool 140, either automatically if it is configured to independently determine the point of resumption, or upon the request of the collection server 132 if it is the collection server 132 that makes the determination, may resume transmission of the data from the file server to the collection server, transmitting only those files that are marked (in the catalog housed in the ongoing collections area 126 of the database server 118) as uncollected.

The database server 118 also communicates with the collection server 132 and the collection tool 140 in completing the collection process. Once the collection tool 140 has attempted to transmit all files comprising to the collection server 132, and the corresponding status information has been communicated to the database server 118, each item in the file catalog for the particular file server should be marked as either successfully collected, which items correspond to those files temporarily stored in the landing zone 154, or unsuccessfully collected, which items correspond to those files that did not arrive at the collection server 132 for one reason or another.

Recalling that in some embodiments the database server 118 is in communication with the case management server 112, according to certain embodiments of the invention the case management server 112 is configured to display the status of the collection as stored in the ongoing collections area 126 of the database server 118 to the eDiscovery Manager through the user interface 116. During collection, the catalog, or certain portions of the catalog, as well as the progress of individual file uploads and the progress of transmitting all files in a given folder, may be presented to the eDiscovery Manager through the user interface 116. The eDiscovery Manager may, through the user interface, manually excuse any items in the catalog presented as unsuccessfully collected. On the other hand, the eDiscovery Manager may choose not to excuse an unsuccessfully collected file and instead request that the collection tool 140 attempt to collect that file again. Alternatively, and in accordance with another embodiment, the collection tool 140 will continually attempt to collect a file until it is successfully collected or manually excused. According to some embodiments, the case management server 112 or the collection server 132 is configured to automatically excuse files based on preset instructions. For example, the case management server 112 may automatically excuse the collection of files that were not created and have not been modified by the targeted user.

According to one embodiment, once all items in the catalog in the database server 118 are marked as either collected or excused, the collection server 132 determines that the collection is complete and transmits the data from the temporary storage of the landing zone 154 to the storage of the long-term network storage device 142. The collection server 132 may be in direct communication with the long-term network storage device 142 and may directly transmit the data thereto, or may transmit the data to yet another intermediary server, or servers, that ultimately store the data in permanent storage in the long-term network storage device 142. Upon determination by the collection server 132 that the collection is complete, the collection server 132, or another server in the system, may relay that message to the collection tool 140, which is configured to automatically terminate its access to the targeted file server upon receipt of such a message.

Referring now to FIG. 2, a flow chart is provided that illustrates an exemplary procedure 200 for collecting data from a personal network storage area (i.e. a HomeSpace) 136 via a communication network 160, in accordance with an embodiment of the invention. Pursuant to a discovery request, the eDiscovery Manager will be required to collect data stored by a certain employee on network storage devices. The network storage devices may be in any form now known or hereafter developed, as the mapping tool 130 and the collection tool 140 are highly configurable and may be programmed to recognize new types of network storage and implement the methods described herein within a system having such storage devices. Prior to inputting identifying information relating to the targeted employee into the user interface 116, the HomeSpace paths associated with that employee's network user identifications should be ascertained and stored in the database server 118. Accordingly, as represented by block 202, the exemplary procedure 200 begins with executing the mapping tool 130 to crawl the communication network 160 and identify the paths of HomeSpaces residing on the communication network 160. As represented by block 204, the HomeSpace paths are then stored in the database server 118 and related within the database server 118 to the network user identifications of the network users to whom the HomeSpaces belong. It should be understood that the mapping tool 130 is run after identification of the target employee but before collection of the HomeSpace data via the collection tool 140.

Despite discussion herein regarding the mapping tool 130 generating a general and complete listing of all HomeSpaces within the communication network 160 and the user identifications to which they relate, it should be understood that, in accordance with some embodiments, the mapping tool 130 may be executed with the collection of a particular individual in mind. In this respect, the features and functionality of the mapping tool 130 may be altered from those described above such that the mapping tool 130 is configured to scan the plurality of servers 134 in the communication network 160 and locate the HomeSpaces associated with a particular user identification. More specifically, the mapping tool 130 would be configured to locate paths of file servers within the network that have a particular user identification embedded in them. This differs from the general case, in which the mapping tool 130 was configured to locate paths of file servers that contained any user identification. In embodiments where the mapping tool 130 is directed to locating a particular user's HomeSpace paths, the mapping tool 130 would most likely not be executed prior to the eDiscovery Manager selecting a particular user for collection. In such embodiments, the mapping tool 130 could be automatically executed after the user identification or other identifier is input by the eDiscovery Manager, as described below. Therefore, it should be appreciated that the order of steps described herein is not the only order in which the present invention may be practiced, and indeed, particular steps may be reversed and/or moved in accordance with the system and method of the invention.

Once the HomeSpace directory has been generated, the eDiscovery Manager may specify identification information for an individual whose files should be collected from network storage. Therefore, and according to block 206, the next step is identifying a network user for collection. In this regard, the eDiscovery Manager, through the user interface 116, enters a certain identifier for the employee. This identifier may be, for example, a network user identification for the employee, the employee's name, a human resources identifier, etc. If the identifier entered by the eDiscovery Manager is not a network user identification of the type used in naming the paths of HomeSpaces, then the case management server 122 must be able to access a database and determine the user identifications associated with the input identifier. Once the user identifications have been ascertained, and as represented by block 208, the HomeSpace directory housed in the database server 118 is accessed to determine the HomeSpace paths associated with the targeted employee. As discussed above, these particular HomeSpace paths may be copied out of the directory and stored in a distinct area within the database server 118 for ongoing collections.

Next, as represented by block 210, the collection tool 140 is executed to access one or more HomeSpaces 136 using the paths obtained from the HomeSpace directory in the database server 118. According to one embodiment, if the collection server 122 locates a HomeSpace path in the ongoing collections area of the database server 118 that it has not yet addressed, the collection tool 140 accesses the HomeSpace 136 by utilizing the identified HomeSpace path and inherent permissions arising out of elevated network credentials. The procedure continues as represented by block 212 by copying and transmitting to the collection server 132 the files stored in the HomeSpace 136. According to some embodiments, the collection tool 140 may copy and upload the files to the collection server 132. Prior to or during transmission, the files may be compressed and/or hashed. As the files are uploaded from the HomeSpace 136 to the collection server 132, the progress of transmission may be communicated to the database server 118, and ultimately, to the user interface 116, by either the collection tool 140 or the collection server 132. Therefore, the catalog of files in the HomeSpace that is stored in the database server 118 is continually updated to show which files have been successfully collected, which files encountered problems during collection (and were perhaps excused by the eDiscovery Manager), and which files remain to be collected.

The collection procedure continues as represented by block 214 with storing the collected data in the landing zone 154. The collection server 132, upon receipt of the files from the HomeSpace 136 as transmitted by the collection tool 140, stores the files in the landing zone 154 and awaits a final determination that collection is complete. Through communication between the collection server and the database server 118, it is determined that collection is complete when each item in the catalog of the database server 118 has been successfully collected or excused. Alternatively, it may be provided, either by the eDiscovery Manager or an administrator of the system, that a different status of an item in the catalog is not an impediment to a determination that collection is complete, and in that case, it could be determined that collection is complete even though not every file was collected or excused.

When the collection server 132 either makes the determination that collection is complete, or receives notification that collection is complete, in accordance with different embodiments of the present invention, the data in the landing zone 154 is finally stored in the long-term network storage device 142, as set forth in block 216. The collection server 132 transmits the data from the temporary storage area of the landing zone 154 to the permanent storage area of the long-term network storage device 142. This signals the end of the collection process, and in accordance with some embodiments, the collection tool 140 disengages from the HomeSpace 136. Alternatively, and in accordance with some embodiments of the invention, transfer of data to the permanent storage area of the long-term network storage device 142 is not required and the collection tool 140 may disengage from the HomeSpace 136 upon confirmation that all files have either been successfully collected or excused by the eDiscovery Manager.

Referring now to FIG. 3, a flow chart is provided that illustrates an exemplary procedure 300 for collecting data from a shared network storage area (i.e. a Shared Drive) 138 via a communication network 160, in accordance with an embodiment of the invention. As represented by block 302, the procedure begins with the eDiscovery Manager collecting information about the targeted employee's network storage usage in an attempt to identify the path of a shared network storage device that the employee has used to store data. As discussed previously, the eDiscovery Manager may use information provided by the employee directly and/or may rely on a listing of network resources that have been used by the employee, which listing can be generated by an automated local collection tool deployed to and installed on the employee's machine. Once the eDiscovery Manager has a general idea of the location of a network storage device used by the employee, the file browsing tool 150 may be employed as represented by block 304 to browse drives and locate particular folders that contain files created or modified by the employee. The file browsing tool 150 allows the eDiscovery Manager to obtain the specific path of a Shared Drive that was previously only described in general terms.

Next, in accordance with block 306, the eDiscovery Manager may utilize the user interface 116 to input the particular path of a Shared Drive 138. At this time, the eDiscovery Manager may also input an identifier for the targeted employee. This identifier ensures that the system is aware of the individual to whom the Shared Drive collection relates. Based on the input path, and in accordance with block 308, the collection tool 140 accesses the Shared Drive 138. Prior to the collection tool 140 copying and/or transmitting the files located on the Shared Drive, and as represented by block 310 the collection tool 140 confirms that the files meet certain defined criteria. For example, as discussed above, the collection tool 140 may determine the size of the files to be collected, whether any files are executables or another unauthorized type, and whether any files are located in nearline storage. Based on these initial determinations and the specific criteria that is programmed into the collection tool 140, the collection tool 140 may not immediately begin copying files and may require that the eDiscovery Manager authorize it to continue.

If the files located in the Shared Drive 138 meet the preset required criteria, or if they fail to meet the criteria but the eDiscovery Manager authorizes collection anyway, the collection process continues in the same manner as with the HomeSpace collection process. In block 310, the files are copied and transmitted to the collection server 132, in block 312, the files are stored in the landing zone 154, and in block 314, the files are finally stored in the long-term network storage device 142. It should be noted that although procedures 200 and 300 were described separately herein, the procedures are, in many embodiments of the invention, integrated to form a single method. In that instance, the HomeSpace paths obtained in an automated fashion from the HomeSpace directory (generated by the mapping tool 130 and stored in the database server 118) and the Shared Drive paths input manually by the eDiscovery Manager (and obtained with the file browsing tool 150) may be compiled together in the queue ongoing collection area of the database server 118. Furthermore, it is worthwhile to note that the collection data for multiple individuals may be housed in the database server 118 at one time. Each path and all collection status data may be organized within the database server 118 so that it is related to a single individual (perhaps by using the individual's identifier), but the collection queue for the collection tool 140 may contain a mix of HomeSpaces and Shared Drives for different employees.

It should be understood that when two devices are described herein as communicating over a network, the devices may be directly coupled to each other or directly coupled via one or more other network devices. Furthermore, although numerous servers are described above, said servers need not be separate devices and may, in some embodiments, be combined into one or more devices that perform the functions of multiple servers. It should also be appreciated that, in some embodiments, the servers are all maintained by the company whose employees and client machines are subject to the electronic discovery request, while in other embodiments, a second separate company may perform the electronic discovery process described herein for the first company. For example, in one embodiment, the long-term network storage device 142 and the employee machine 136 are owned or monitored by a first company and the case management server 112, database server 118, and collection server 132 are owned or monitored by a second company that provides an eDiscovery management service for the first company.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for identifying a network storage area associated with a user, the method comprising:
   crawling, via a computing device processor, a network to scan a plurality of network devices residing on the network;
   identifying, via a computing device processor, as a result of the scanning, a path of the network storage area as being associated with the user based on the path including an indicator associated with the user;
   generating, via a computing device processor, and storing, in computing device memory, a directory that stores a plurality of paths and indicators in association with respective users;
   transmitting, via a computing device processor, the identified path and indicator associated with the user from a scanned network device, at which the path and the indicator were identified, to the directory;
   in response to copying data from the network storage area, generating, via a computing device processor, an evidence object and associating the evidence object with the data, wherein the evidence object reflects at least one of an identity of the network storage location or location of the network storage area; and
   storing, at the network storage device, the evidence object in conjunction with the data, wherein the association between the evidence object and data insures that the evidence object adheres to the data for subsequent communication of the data throughout the network.

2. The method of claim 1, wherein the network storage area is a personal network storage area associated with the user.

3. The method of claim 1, further comprising:
   accessing, via a computing device processor, the network storage area located at the identified path via the network based on the identified path and the indicator being stored in the directory;
   copying, via a computing device processor, data stored at the network storage area; and
   transmitting, via a computing device processor, the data from the network storage area to a network storage device.

4. The method of claim 3, further comprising:
   generating, via a computing device processor, and storing, in computing device memory, a catalog of the data stored at the network storage area; and
   updating, via a computing device processor, the catalog as the data is transmitted to the network storage device to reflect the status of the data.

5. The method of claim 4, further comprising:
   determining, via a computing device processor, that transmission of the data from the network storage area to the network storage device is complete based on the status of the data in the catalog.

6. The method of claim 4, further comprising resuming, via a computing device processor, an interrupted transmission of the data to the network storage device at a point of interruption based on accessing the catalog to determine which files from the data have been previously successfully transmitted.

7. A system for identifying a network storage area associated with a user, the system comprising:
   a computing apparatus including a memory and at least one processor in communication with the memory;
   a mapping tool stored in the memory, executable by the processor and configured to crawl the network and scan a plurality of network devices residing on the network to identify a path of the network storage area as being associated with the user based on the path including an indicator associated with the user;
   a directory stored in the memory and configured to receive the identified path and indicator as transmitted from a scanned network device, at which the path and the indicator were identified, to the directory and compile the path and indicator in association with the user; and
   a collection tool stored in the memory, executable by the processor and configured to copy data from the network storage area, generate an evidence object, associate the evidence object with the data and store the evidence object in conjunction with the data, wherein the evidence object reflects at least one of an identity of the network storage location or location of the network storage area and wherein the association between the evidence object and data insures that the evidence object adheres to the data for subsequent communication of the data throughout the network.

8. The system of claim 7, further comprising a collection tool stored in the memory, executable by the processor and configured to access the network storage area located at the identified path based on the identified path and the indicator being stored in the directory, copy data stored in the network storage area, and transmit the copied data to a network storage device.

9. The system of claim 8, wherein the collection tool is further configured generate a catalog of the data stored at the network storage area, wherein the catalog is updated as the data is transmitted to the network storage device to reflect the status of the data.

10. The system of claim 9, wherein the collection tool is further configured to determine that transmission of the data from the network storage area to the network storage device is complete based on the status of the data in the catalog.

11. The system of claim 9, wherein the collection tool is further configured to resume an interrupted transmission of the data to the network storage device at a point of interruption based on accessing the catalog to determine which files from the data have been previously successfully transmitted.

12. The system of claim 8, wherein the collection tool is further configured to identify nearline files stored at the network storage area.

13. The system of claim 8, wherein the collection tool is configured to determine a size estimate of the data stored at the network storage area.

14. The system of claim 7, further comprising a case management tool stored in the memory, executable by the processor and configured to receive user-identifying information and provide for observation and management of collection of data from the network storage area.

15. A computer program product for identifying a network storage area associated with a user, the computer program product comprising a non-transitory computer readable medium having computer readable program instructions stored therein, wherein the computer readable program instructions comprise:

first instructions configured to crawl a network to scan a plurality of network devices residing on the network;

second instructions configured to identify, as a result of the scanning, a path of the network storage area as being associated with the user based on the path including an indicator associated with the user;

third instructions configured to generate and store a directory that stores a plurality of paths and indicators in association with respective users;

fourth instructions configured to transmit the identified path and indicator associated with the user from a scanned network device, at which the path and the indicator were identified, to the directory;

fifth instructions configured to, in response to copying data from the network storage area, generate an evidence object and associate the evidence object with the data, wherein the evidence object reflects at least one of an identity of the network storage location or location of the network storage area; and sixth instructions configured to store the evidence object in conjunction with the data, wherein the association between the evidence object and data insures that the evidence object adheres to the data for subsequent communication of the data throughout the network.

16. The computer program product of claim 15, wherein the fifth instructions are further configured to access the network storage area located at the identified path via the network based on the identified path and the indicator being stored in the directory, copy data stored at the network storage area, and transmit the data from the network storage area to a network storage device.

17. The computer program product of claim 15, further comprising:

seventh instructions configured to generate and store a catalog of the data stored at the network storage area; and eighth instructions configured to update the catalog as the data is transmitted to the network storage device to reflect the status of the data.

* * * * *